(12) United States Patent  (10) Patent No.: US 7,958,348 B2
Stransky  (45) Date of Patent: Jun. 7, 2011

(54) METHOD FOR SECURING AN ELECTRONIC CERTIFICATE

(75) Inventor: Philippe Stransky, Cheseaux-sur-Lausanne (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 771 days.

(21) Appl. No.: 10/890,266

(22) Filed: Jul. 14, 2004

(65) Prior Publication Data

US 2005/0015587 A1  Jan. 20, 2005

(30) Foreign Application Priority Data

Jul. 14, 2003 (CH) .................................. 1232/03

(51) Int. Cl.
H04L 29/06 (2006.01)
(52) U.S. Cl. ........ 713/156; 713/173; 713/175; 713/157; 713/179; 713/184; 726/10; 726/4; 726/5; 726/17; 726/18; 726/19; 726/20; 726/21
(58) Field of Classification Search .................. 713/175, 713/173, 156, 157, 179, 184; 726/10, 17–21, 726/4–5
See application file for complete search history.

(56) References Cited

U.S. PATENT DOCUMENTS

| | | | |
|---|---|---|---|
| 5,982,898 A | | 11/1999 | Hsu et al. |
| 6,148,404 A * | | 11/2000 | Yatsukawa ........................ 726/2 |
| 6,968,242 B1 * | | 11/2005 | Hwu et al. ....................... 700/82 |
| 7,111,173 B1 * | | 9/2006 | Scheidt .......................... 713/186 |
| 7,231,371 B1 * | | 6/2007 | Cantini et al. ................... 705/65 |
| 2002/0152382 A1 * | | 10/2002 | Xiao .............................. 713/173 |
| 2003/0028493 A1 * | | 2/2003 | Tajima et al. .................... 705/67 |
| 2003/0069915 A1 * | | 4/2003 | Clough et al. ................ 709/100 |
| 2003/0084172 A1 * | | 5/2003 | deJong et al. ................. 709/229 |
| 2003/0084311 A1 * | | 5/2003 | Merrien et al. ............... 713/191 |

(Continued)

FOREIGN PATENT DOCUMENTS

| | | |
|---|---|---|
| EP | 1 282 026 A2 | 2/2003 |
| WO | WO 00/51052 A1 | 8/2000 |
| WO | WO 01/39143 A1 | 5/2001 |
| WO | WO 02/17557 | 2/2002 |
| WO | WO 03/001736 A1 * | 1/2003 |
| WO | WO 03/056749 A1 | 7/2003 |

OTHER PUBLICATIONS

Taiwanese Search Report dated Oct. 12, 2010 in corresponding Taiwanese Patent Application No. 93118841.

*Primary Examiner* — Edan Orgad
*Assistant Examiner* — Canh Le
(74) *Attorney, Agent, or Firm* — Harness, Dickey & Pierce, P.L.C.

(57) ABSTRACT

A method is for securing and verifying an electronic certificate issued by an authority to an owner. The certificate is stored in the memory of a user unit operated by the owner. The user unit transmits all or part of the data of the certificate to the authority. Further, during an initialization phase, the method includes determining, by the authority, a network identifier pertaining to the user unit, and storing, by the authority, the identifier in connection with the data of the certificate. As such, the use of an electronic certificate by individuals other than the owner may be prevented. Further, damages to the owner, in the case of the theft or copying of a certificate, may be avoided.

10 Claims, 1 Drawing Sheet

U.S. PATENT DOCUMENTS

| | | | |
|---|---|---|---|
| 2003/0135732 A1* | 7/2003 | Vaha-Sipila | 713/156 |
| 2004/0010687 A1* | 1/2004 | Futa et al. | 713/168 |
| 2004/0015689 A1* | 1/2004 | Billhartz | 713/156 |
| 2004/0088542 A1* | 5/2004 | Daude et al. | 713/156 |
| 2004/0122960 A1* | 6/2004 | Hall et al. | 709/229 |
| 2005/0005095 A1* | 1/2005 | Meandzija et al. | 713/155 |

* cited by examiner

METHOD FOR SECURING AN ELECTRONIC CERTIFICATE

The present application hereby claims priority under 35 U.S.C. §119 on Swiss patent application number CH 01232/03 filed Jul. 14, 2003, the entire contents of which are hereby incorporated herein by reference.

FIELD OF THE INVENTION

The present invention generally concerns a method for securing an electronic certificate, in particular in view to avoid its copying and its use by a third party.

BACKGROUND OF THE INVENTION

An electronic certificate is a digital file that can be compared to a virtual passport.

Like a passport, it contains a certain number of personal data corresponding to its owner. It is issued by a recognized authority that can guarantee the authenticity of the data contained in the certificate and its inseparable link with the owner.

This certificate is stored in the memory of a user unit such as the hard disk of a computer, the memory or the SIM card of a mobile phone, the security module of a digital pay television decoder or all other devices requiring on-line identification of the user, etc. The latter can thus securely communicate on a telecommunications network by connecting the certificate with the transmitted data.

The certificate allows, for example, identification on the Internet, the generation of electronic signatures for transactions of high added values and to transmit sensitive data with complete confidentiality.

At present, it is possible for a third party to copy a certificate without the knowledge of its owner with the aid of an adequate program of the Trojan horse type. The third party can thus fraudulently take advantage of the same privileges as the owner in the usage of certain on-line services. When it is a question of financial transactions or particular rights concerning the diffused products, the consequences of this type of fraud can be particularly disastrous for the owner.

The document US2003/0084172 describes a method for obtaining a service on a data communication network including a registration from an authority. The results of this registration are used to obtain a service from a supplier. These results contain data pertaining to the user that the supplier is capable of verifying by requesting data from the authority. The drawback of this method is that it uses data linked to a user, data that can be picked up and reproduced by another user with the aim of obtaining services in a fraudulent way.

SUMMARY OF THE INVENTION

One aim of an embodiment of this invention is to prevent the use of the certificate by any individual other than the owner and to avoid all damages to the owner in the case of the theft or copying of a certificate.

This aim may be achieved by a method of one embodiment for securing an electronic certificate issued by an authority to an owner, the certificate being stored in the memory of a user unit operated by the owner, the user unit transmits all or part of the data of the certificate to the authority, characterized in that, during an initialization phase, said method comprises the following steps:

determination by the authority of a network identifier pertaining to the user unit, storage by the authority of said identifier in connection with the data of the certificate.

These steps essentially concern the initialization step. During operation, a verification step is activated when the owner of the certificate operates his unit by using his certificate together with a predetermined service originating from a service supplier. It includes the following steps:

identification of the owner by the transmission of the certificate to the service supplier, determination of a network identifier pertaining to the user unit by the service supplier, transmission of the set formed by the certificate and the network identifier to the authority, verification of said set by comparing with the data registered in the database during the initialization step, transmission of the result of the comparison to the service supplier who authorizes the previously requested service to the connected user according to said result.

The network identifier pertaining to the user unit may include data serving to identify in a unique way the unit with a telecommunications network. This network serves to access successively the authority and the service supplier, this identifier not being transmitted as such by the user unit but rather being determined in an autonomous way by either the authority, or the supplier on the basis of material parameters of the communication. According to the method of an embodiment of the invention, it is a question of matching the certificate with the material of the user unit or more precisely with the unit that uses on-line services in order to avoid the fraudulent copying of the certificate of the memory of a unit towards the memory of another.

In the case of the Internet connection, each computer transmits a number defining it in a unique way on the network. This number, called MAC (Media Access Control) address that identifies the configuration of the material of a user is automatically determined by the server of the service supplier. The certificate of a user unit connected to this server can be "personalized" in this way with the aid of this address. This address is thus not communicated as a parameter by the user unit but it results of its capacity to transmit on a network. This address cannot be modified (at least easily) by the owner of the certificate or by a third party who has copied this certificate.

Within the scope of GSM mobile telephony, the unique number identifying each mobile telephone, called IMEI (International Mobile Equipment Identity), connected to the network can be used as an identifier of the unit being used.

In a similar way, a Pay-TV decoder disposing of a return channel can be identified by an operator by way of its unique number that characterizes its hardware or by way of the telephone number used by the modem of the return channel.

In general, all apparatus connected to a network has an address or a number specific to its configuration hardware that allows the apparatus to be identified by a server or by other apparatuses with which it communicates.

During the initialization phase, the user unit is directly connected to a server managed by the authority responsible on one hand for receiving data related to the certificate or the certificate in its entirety and on the other hand for determining a network identifier relating to the user unit. The authority registers in a database this identifier by linking it with the concerned certificate.

This initialization is preferably carried out once with a given certificate in order to avoid multiple registrations of network identifiers originating from several units for the same certificate.

It is also possible to limit initialization in a time period by fixing a maximum period length during which it is possible to register a certificate from the authority, for example starting from the transmission of the certificate to the user.

This procedure is preferably related to the installation of the certificate in the user's apparatus. This procedure includes a call to the authority to establish and to add the network identifier of this apparatus to the data of the certificate. It is possible to render this connection obligatory, for example during the dialogue between the authority and the user apparatus, the authority transmits an instruction that validates the certificate and authorizes its use.

According to a variant of the method of an embodiment of the invention, a code or password can be used during the connection of the user to the server of the authority. This code serves in a way to authorize the link between the network identifier and a certificate with the authority issuing the certificate. The code is preferably transmitted to the user through a different channel from the one used for the certificate in order to preserve its confidentiality. For example, this password or PIN code can be sent to the user by post, as is the case with banking cards. Following the registration of the network identifier with the certificate, the password can be disabled in order to avoid the multiple registration of the same certificate by different units.

In this variant, the validity duration of the code can be fixed in the same way as in the previous variant in order to allow registration in a limited period. In a case where this period was exceeded, it would be necessary to request a new code from the authority for an eventual supplementary cost.

According to another variant of the method according to an embodiment of the invention, several units belonging to a common user and each having a different network identifier can be registered in association with the same certificate. This situation could occur during the use of a certificate on a removable support such as a smart card. The use of the certificate is then limited by the group of units whose identifier is duly registered in database of the authority. This type of registration could be carried out not only with a unique password but also with a list of different password for each unit.

BRIEF DESCRIPTION OF THE DRAWINGS

The invention will be better understood thanks to the following detailed description that refers to the annexed figures, illustrating the method according to an embodiment of the invention, given as a non-limitative example.

DETAILED DESCRIPTION OF THE PREFERRED EMBODIMENTS

The management center of the authority (AU) merges a certificate-issuing center (CI) responsible for producing and managing the certificates and a verification center (VE) linked to a database (BD) containing the certificates (C) accompanied by the data pertaining to units used by the owners of the certificates (C).

In the case of computers connected to the Internet, the services using the certificates consist for example in a secured connection for electronic trading, a privileged access to programs or to protected data.

During initialization or the acquirement of a certificate by a user, the latter receives a password that is usually in the form of a PIN code (Personal Identification Number) with his new certificate (C). The user can connect with the verification center VE and declare the characteristics of his certificate. This code allows the user to prove that he is the legitimate owner of this certificate and once introduced, the verification center VE reads the network identifier HID of the user and associates this identifier with the certificate C.

This initialization step can be carried out with several devices that can contain the certificate of the user if for example this certificate is on a removable support such as a smart card. All the network identifiers HID will be associated with this certificate thanks to the introduction of the password. In order to simplify the procedure at user level, it is not necessary, neither useful, for the identifier HID to be known to the user. The registration of this parameter with the certificate C is thus carried out automatically after the introduction of a valid PIN code.

The certificate C is thus activated and usable as long as the user conserves said certificate on the device whose identifier HID has been registered. The transfer of this certificate C to another computer remains possible, but said certificate becomes unusable because the MAC address of this second computer is not registered in the database of BD of the authority AU. It is thus noted that the certificate is connected to a particular computer that is different from the others, in this example, by its MAC address.

Figure 1:
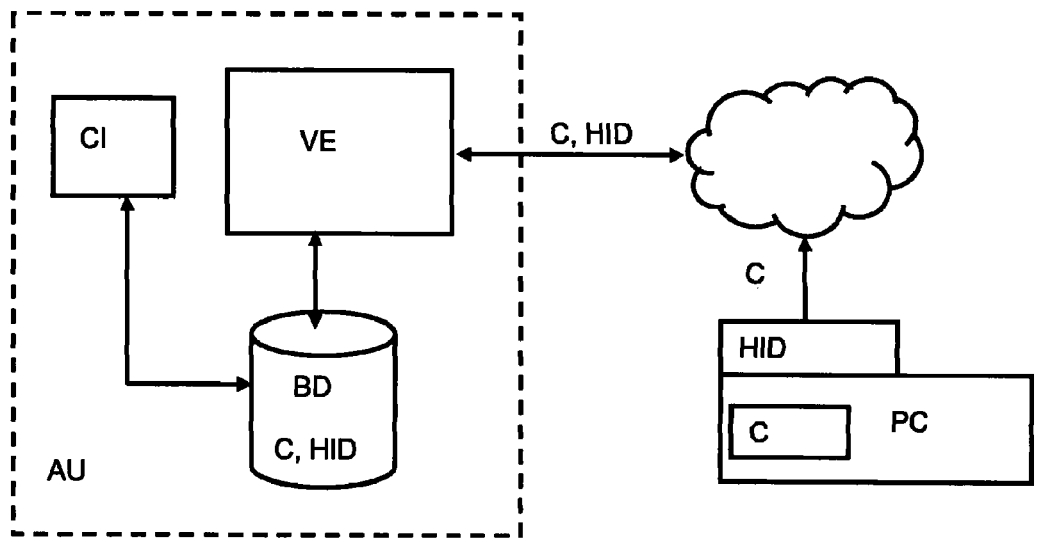
FIG. 1 represents a block schematic illustrating the initialization step of a certificate on a user unit
Figure 2:
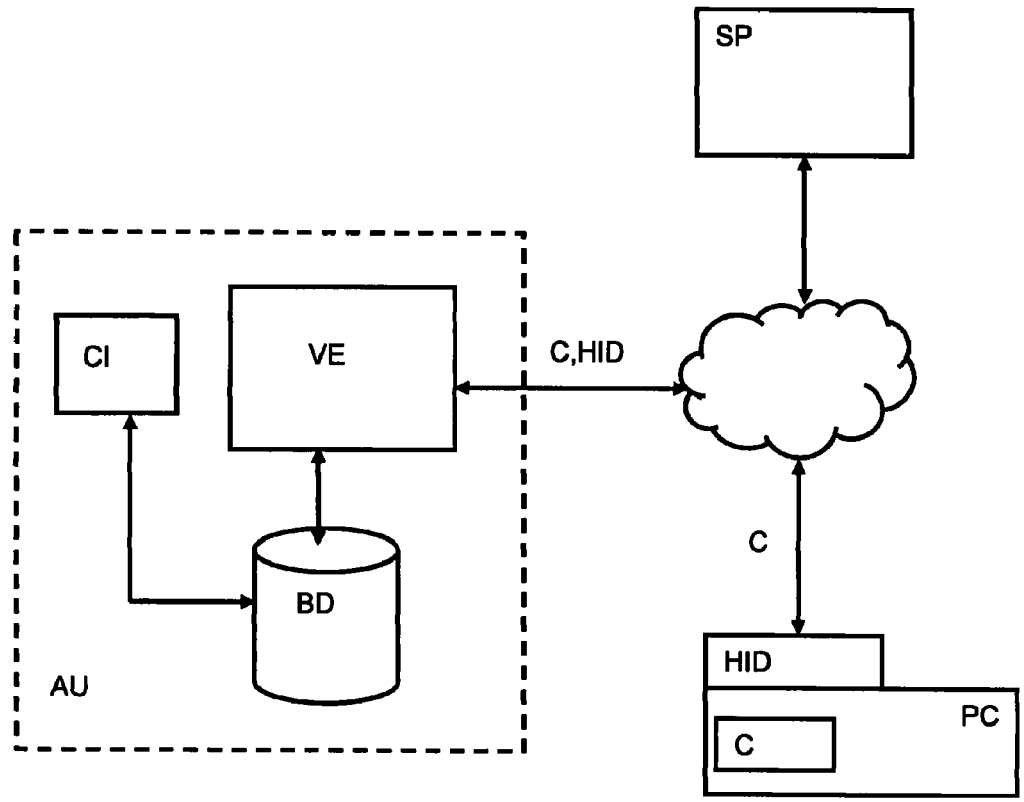
FIG. 2 represents a block schematic illustrating the verification step of a certificate on a user unit

FIG. 2 shows the using step of such a certificate. The user accesses a service managed by a service supplier SP. The latter reads the certificate that is transmitted by the user and determines an identifier HID allowing the definition of the user device PC on the network used to access the supplier SP.

In this example, the identifier corresponds to the MAC address of the certificate C owner computer PC.

The service supplier SP determines the MAC address of the computer PC that is connected then transmits this address to the verification center VE with the certificate C.

The verification center can compare the data transmitted by the supplier SP with the data stored in the database BD. The result of the comparison will be transmitted to the supplier SP that authorizes the use of the service only if the current MAC address of the computer requiring a service corresponds to the address associated with the certificate C in the database BD.

According to an embodiment, a certificate (C) can be registered with several IP addresses belonging to computers managed by the same owner. In this case, the certificate can be stored in the database of the authority with the links pointing towards the different addresses with which it has been activated.

A certificate, registered with the authority according to the method of an embodiment of the invention, can also be deactivated. In fact, it is desirable to allow an owner to be able to update the database of the authority when he changes his unit or wishes to cancel his certificate. Given that the authority has no direct control over the characteristics of the users' computers, the modifications are carried out in a similar way to the activation of a new certificate during the initialization step.

On request, the owner receives a new PIN code or password serving to reactivate a certificate predefined in a new computer and/or deactivate said certificate. In the case of a reactivation, during the accessing of the owner to the authority, the latter determines the new MAC address to be transmitted to the database in order to associate this new address with the certificate.

During a configuration modification such as a deactivation, in a first embodiment, the identification of the owner of a certificate is carried out by the determination of the network identifier HID. The owner transmits the certificate to the verification center and the latter determines the network identifier HID. The comparison with the data contained in the database allows the authentication of the user and the authorization to introduce modifications to his profile.

In another embodiment, the introduction of a PIN password is essentially required for each modification.

A storage medium is adapted to store information of any of the aforementioned programs and is adapted to interact with a data processing facility (such as a computer or computer device) to perform the method of any of the above mentioned embodiments. The storage medium can be offered to the user in the form of a computer-readable storage medium. The storage medium may be a built-in medium installed inside a computer main body or removable medium arranged so that it can be separated from the computer main body. Examples of the built-in medium include, but are not limited to, rewriteable involatile memories, such as ROMs and flash memories, and hard disks. Examples of the removable medium include, but are not limited to, optical storage media such as CD-ROMs and DVDs; magneto-optical storage media, such as MOs; magnetism storage media, such as floppy disks (trademark), cassette tapes, and removable hard disks; media with a built-in rewriteable involatile memory, such as memory cards; and media with a built-in ROM, such as ROM cassettes.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for securing and verifying an electronic certificate, the electronic certificate being stored in a memory of a user unit operated by an owner of the user unit, the method comprising:

during an initialization phase:
transmitting, by the user unit, data of the electronic certificate to a server managed by an authority;
determining, by the authority, a network identifier corresponding to the user unit, the network identifier being calculated based on hardware configuration parameters received from the user unit;
storing, by the authority, the electronic certificate and the network identifier in a database of the server, the network identifier being linked with the data of the electronic certificate, wherein the electronic certificate is coupled to a plurality of network identifiers based on a respective plurality of user units stored in the database of the server, and
updating, by the owner of the user unit, the database of the server of the authority; and
during a verification step carried out by a service supplier when the user unit requests a service from the service supplier:
identifying the owner of the user unit by transmitting the electronic certificate to the service supplier;
determining, by the service supplier, the network identifier based on the hardware configuration parameters of the user unit;
transmitting a set including the electronic certificate and the network identifier to the authority;
verifying, by the authority, the electronic certificate and the network identifier of the set transmitted by service supplier by comparing the electronic certificate and the network identifier of the set with the electronic certificate and the network identifier stored in the database during the initialization phase; and
transmitting a result of the comparison to the service supplier, the service supplier authorizing the requested service to the owner based on the comparison result.

2. The method according to claim 1, wherein the storing of the network identifier linked with the data of the electronic certificate is subjected to an introduction of a password by the owner.

3. The method according to claim 2, wherein the password associated with the electronic certificate is received by the owner of the electronic certificate through a channel different from a channel used for transmitting the electronic certificate.

4. The method according to claim 2, wherein the password associated with the electronic certificate is disabled after linking the electronic certificate with the network identifier in the database of the server managed by the authority.

5. The method according to claim 1, wherein the network identifier is determined from an address or a number that uniquely identifies the user unit connected to a network.

6. A method for securing and verifying an electronic certificate issued by an authority to an owner, the method comprising:

during an initialization stage:
storing the electronic certificate in a memory of a user unit operated by the owner, wherein data of the electronic certificate is transmitted to a server managed by the authority;
determining, by the authority, a network identifier based on hardware configuration parameters received from the user unit;
storing, by the authority, the electronic certificate and the network identifier in a database of the server, the network identifier being linked with the data of the electronic certificate, wherein the electronic certificate is coupled to a plurality of network identifiers based on a respective plurality of user units stored in the database of the server, and
updating, by the owner of the user unit, the database of the server of the authority; and
during a verification step carried out by a service supplier when the user unit requests a service from the service supplier:
identifying the owner of the user unit by transmitting the electronic certificate to the service supplier;
determining the network identifier based on a hardware configuration parameter of the user unit by the service supplier;
transmitting a set including the electronic certificate and the determined network identifier to the authority;
verifying, by the authority, the electronic certificate and the network identifier of the set transmitted by service supplier by comparing the electronic certificate and the network identifier of the set with the electronic certificate and the network identifier stored in the database during the initialization phase; and
transmitting a comparison result to the service supplier that authorizes the requested service to the owner based on the comparison result.

7. The method according to claim 6, wherein the network identifier linked with the data of the electronic certificate is subjected to an introduction of a password by the owner.

8. The method according to claim 7, wherein the password associated with the electronic certificate is received by the owner of the electronic certificate through a channel different from a channel used for transmitting the electronic certificate.

9. The method according to claim 7, wherein the password associated with the electronic certificate is disabled after linking the electronic certificate with the network identifier in the database of the server managed by the authority.

10. The method according to claim 6, wherein the network identifier is determined from an address or a number that uniquely identifies the user unit connected to a network.

* * * * *